(12) United States Patent
Haag (10) Patent No.: US 9,752,444 B2
(45) Date of Patent: Sep. 5, 2017

(54) EROSION SHIELD FOR A WIND TURBINE BLADE

(71) Applicant: LM WP PATENT HOLDING A/S, Kolding (DK)

(72) Inventor: Michael Drachmann Haag, Esbjerg V (DK)

(73) Assignee: LM WP PATENT HOLDING A/S, Kolding (DK)

( * ) Notice: Subject to any disclaimer, the term of this patent is extended or adjusted under 35 U.S.C. 154(b) by 590 days.

(21) Appl. No.: 14/365,646

(22) PCT Filed: Dec. 5, 2012

(86) PCT No.: PCT/EP2012/074488
§ 371 (c)(1),
(2) Date: Jun. 16, 2014

(87) PCT Pub. No.: WO2013/092211
PCT Pub. Date: Jun. 27, 2013

(65) Prior Publication Data
US 2015/0132140 A1    May 14, 2015

(30) Foreign Application Priority Data

Dec. 19, 2011  (EP) ..................................... 11194239

(51) Int. Cl.
*F03D 1/06* (2006.01)
*F01D 5/28* (2006.01)

(52) U.S. Cl.
CPC ........... *F01D 5/286* (2013.01); *F03D 1/0633* (2013.01); *F03D 1/0675* (2013.01);
(Continued)

(58) Field of Classification Search
None
See application file for complete search history.

(56) References Cited

U.S. PATENT DOCUMENTS 3,144,349 A    8/1964  Swingler et al.
5,306,120 A    4/1994  Hammer et al.
(Continued)

FOREIGN PATENT DOCUMENTS

EP            2153065 A2      2/2010
GB     WO 2009118545 A1 *  10/2009  ............. B32B 27/30
(Continued)

*Primary Examiner* — Gregory Anderson
*Assistant Examiner* — Juan G Flores
(74) *Attorney, Agent, or Firm* — Nath, Goldberg & Meyer; Tanya E. Harkins; Annie J. Kock (57) ABSTRACT

An erosion shield for a wind turbine blade is described, the erosion shield having a plurality of layers of erosion resistant material. The layers of erosion resistant material have an adhesive bond strength between adjacent layers less than the cohesive tensile strength of the layers, such that the outer layers of erosion resistant material are arranged to peel away or delaminate from the erosion shield under the action of the wind once the particular layer is ruptured or eroded. This dynamic removal of the outer layers of the erosion shield provides for increased shield lifetime, and a reduction in the maintenance operations required for a wind turbine blade having such an erosion shield.

19 Claims, 5 Drawing Sheets

(52) U.S. Cl.
CPC ......... *F05B 2230/90* (2013.01); *Y02E 10/721* (2013.01); *Y02P 70/523* (2015.11)

(56) References Cited

U.S. PATENT DOCUMENTS

| | | | |
|---|---|---|---|
| 2004/0118978 A1 | 6/2004 | Anning | |
| 2009/0246033 A1* | 10/2009 | Rudling | B32B 27/30 416/241 A |
| 2010/0008788 A1* | 1/2010 | Barbee | F01D 5/288 416/224 |
| 2011/0142678 A1 | 6/2011 | Santiago et al. | |

FOREIGN PATENT DOCUMENTS

| | | |
|---|---|---|
| WO | 2008157013 A1 | 12/2008 |
| WO | 2009118545 A1 | 10/2009 |

* cited by examiner

EROSION SHIELD FOR A WIND TURBINE BLADE

FIELD OF THE INVENTION

The present invention relates to an erosion shield for a wind turbine blade, and a wind turbine blade having such an erosion shield.

BACKGROUND OF THE INVENTION

During the lifetime of a wind turbine, considerable resources are expended on continued maintenance operations to ensure optimum turbine performance. With regard to the blades of a wind turbine, erosion at the leading edge of the blades is one area of attention.

It is known to provide an erosion shield at the leading edge of a wind turbine blade. The erosion shield comprises a layer or coating of resilient erosion resistant material which is applied along the length of the blade covering the leading edge. The erosion shield provides improved resistance to erosion, being usually formed of a resilient material as opposed to the relatively brittle fibre composite material used to produce the body of a wind turbine blade, and accordingly acts to improve the overall durability of the wind turbine blade. An example of an erosion shield comprising a polymeric film can be seen in EP 2 153 065.

Field experience has shown that such erosion shields or erosion tapes will last approximately between 5-8 years, depending on the environmental conditions of the location of the wind turbine, as well as the turbine operating conditions, especially blade tip speed. However, when the erosion resistant layer ruptures due to heavy erosion, in general there will be portions of the layer left on the turbine blade to freely flutter in the wind. This fluttering will result in a loss of aerodynamic performance of the blade, as well as the generation of additional aerodynamic noise.

In the case of such a rupture of the erosion shield, such reduced turbine performance will continue until a maintenance operation is performed to remove the ruptured shield. This involves an extensive and complicated operation to stop operation of the turbine, remove the ruptured shield from along the leading edge of the turbine blade, and to apply a new erosion shield along the leading edge.

It is an object of the invention to provide an erosion shield for a wind turbine blade which reduces the problems associated with shield rupture, and requires reduced maintenance.

SUMMARY OF THE INVENTION

Accordingly, there is provided an erosion shield for a wind turbine blade, the erosion shield having an external surface exposed at a leading edge of the wind turbine blade and comprising:
- a plurality of layers of erosion resistant material, said plurality of layers arranged in a stack from an outermost layer substantially forming said external surface to an innermost layer arranged to be attached to a leading edge of a wind turbine blade, said plurality of layers bonded to adjacent layers in the stack,
- wherein said plurality of layers of erosion resistant material have a cohesive strength or tensile strength greater than the adhesive strength or bond strength between adjacent or subsequent layers, such that at least a section of an outermost exposed layer will delaminate or peel from said erosion shield under the action of wind when at least a portion of said section of said outermost exposed layer has been eroded or ruptured, to present a relatively smooth external surface of said erosion shield.

As the outermost layer of erosion resistant material is gradually worn away or eroded during use of the blade, portions of the layer may detach from the surface of the erosion shield and flutter or flap in the wind. Due to the relative weakness of the bond between adjacent layers of the erosion resistant material, once such a break or rupture occurs in the outermost layer, the force of the wind overcomes the relatively weak bonding between successive layers, and acts to delaminate or peel off the remaining section of the layer to remove any free fluttering portions of the erosion resistant material from the erosion shield.

This dynamic removal of outer layers of the erosion shield once such layers fail reduces aerodynamic noise produced by such failures, as well as eliminates any negative aerodynamic performance as a result of fluttering or flapping sections of the erosion shield. It also provides for reduced maintenance of wind turbine blades in service, as the time between service operations to replace or clean an erosion shield of a wind turbine blade is increased.

It will be understood that the erosion shield may be arranged to detach or delaminate an entire layer of erosion resistant material at once, or to delaminate individual sections of the exposed layer or layers which contain the location where the rupture or failure of the erosion shield occurs.

Preferably, said plurality of layers are adhesively bonded to adjacent layers in the stack, and wherein said plurality of layers of erosion resistant material have a cohesive strength greater than the adhesive bond strength between adjacent layers.

While the normal requirement for a good adhesion is above 5 MPa in pull-off according to ISO 4624 with cohesive failure mode, preferably the adhesive bond strength, in particular the pull-off adhesive strength, between adjacent layers is below 5 MPa, preferably below 2 MPa, with adhesive failure mode between the adjacent layers. Such a relatively low adhesive bond strength ensures that adjacent layers will easily delaminate when an outer layer has been eroded or ruptured, to ensure dynamic removal of layers of the erosion shield.

Preferably, said layers of erosion resistant material comprise an inner surface facing away from the external surface of the erosion shield and an outer surface facing towards the external surface of the erosion shield,
- wherein said erosion shield further comprises at least one layer of bridging material located between adjacent layers of erosion resistant material to bond adjacent inner and outer surfaces of adjacent layers of erosion resistant material in said stack.

The erosion shield is formed as an interleaved structure of erosion resistant material and bridging material.

In one embodiment, said at least one bridging layer comprises a layer of adhesive. The adhesive layers are provided as a disposable adhesive layer between layers of the erosion resistant material, which will be discarded when the outer layer of erosion resistant material delaminates or peels away from the erosion shield. The bridging layer may comprise a thermoplastic material, and/or a coating material that will work as a semi-resistant erosion layer as well as functioning as an adhesive between adjacent layers of the erosion resistant material, as the coating material cures after being applied.

Preferably, said at least one bridging layer has a tensile cohesive strength less than the tensile cohesive strength of said layers of erosion resistant material.

Preferably, the elongation-to-break for the bridging layer is lower than the elongation-at-break of the erosion resistant material.

The erosion shield may be formed as a single member having interleaved layers of different substances having different material properties, e.g. the erosion resistant material may comprise a plastic, malleable material which will substantially absorb erosion forces over time, while the bridging layer may comprise a flexible material which is operable to easily peel away from the surface of the shield under the action of wind.

Additionally or alternatively, the bridging layer may comprise a brittle or frangible material which can easily break away from the shield, to remove ruptured portions of the erosion resistant material. In such a case, the tensile strength of the bonding layer is chosen to be easily breakable or frangible, such that the bridging layer can be easily broken off from the erosion shield.

The manufacture of such an erosion shield may be done through co-extrusion of two thermoplastics having different material properties.

Preferably, said at least one layer of bridging material has a relatively stronger bond to an adjacent inner surface of a layer of erosion resistant material than to an adjacent outer surface of a layer of erosion resistant material.

The bridging material is better bonded to the outer layer of the erosion shield, such that the bridging material is discarded or peeled away with the eroded outer layer. For such a construction, the bridging layer may be formed integrally with the outer adjacent layer of erosion resistant material, and adhesively bonded to the outer face of the inner adjacent erosion material layer.

In one embodiment, the bridging layer may be formed by an adhesive tape applied to the underside or inner surface of each layer of erosion material, to bond to the succeeding erosion material layer. In this case, the tape may be applied to the inner surface of the preceding layer of erosion resistant material using a strong adhesive, while the bond to the outer surface of the succeeding layer of erosion resistant material is made using a low surface tension adhesive.

For example, pressure sensitive acrylic adhesives provide a relatively higher bond strength compared to a pressure sensitive silicone based adhesive. In this regard, the bridging layer may be bonded to the inner surface of the preceding layer of erosion resistant material using a pressure sensitive acrylic adhesive, and bonded to the outer surface of the succeeding layer of erosion resistant material is made using a pressure sensitive silicone based adhesive.

Preferably, said erosion shield is arranged to extend in a lengthwise direction along a portion of a leading edge of a wind turbine blade, and wherein said layers of erosion resistant material are divided into a plurality of sections along the length of the erosion shield, wherein said sections of said erosion resistant layers are arranged to individually delaminate when at least a portion of an erosion resistant layer within a particular section has been eroded or ruptured.

The layers of the erosion shield may be divided into different sections along the length of the leading edge, such that individual sections are separately or independently peelable. Accordingly, if the erosion shield layer only ruptures in one part of the erosion shield, then the layer will only be peeled away in the vicinity of that particular rupture point. This prevents the disposal of an entire layer of the erosion shield if there has been only a single minor rupture of the layer, thereby prolonging the lifetime of the entire erosion shield.

Preferably, said plurality of sections are provided towards the tip end of the wind turbine blade.

Due to the higher speed at the tip end of the blade, the erosion is normally seen on more occasions at the blade tip end. Accordingly, sections of an erosion shield arranged at a tip end of a blade will in general undergo more erosion than sections towards the root end of the blade.

Preferably, the erosion shield has a tip end for location towards the tip end of a wind turbine blade and a root end for location towards the root end of a wind turbine blade, said plurality of sections having a section width measured in a longitudinal direction between the root end and the tip end of said erosion shield, wherein said plurality of sections are arranged such that the section width of individual sections decreases moving from the root end to the tip end of the erosion shield.

In one embodiment, the erosion shield has a tip end for location towards the tip end of a wind turbine blade and a root end for location towards the root end of a wind turbine blade, wherein the number of layers or erosion resistant material provided at the tip end of the erosion shield is greater than the number of layers of erosion resistant material provided at the root end of the erosion shield.

As the tip end of the erosion shield will experience greater erosion than the root end, accordingly the provision of a greater number of layers of erosion resistant material at the tip end will lead to a more effective operation of the erosion shield, and a longer lifetime between replacement operations.

Preferably, a boundary between adjacent sections of said layers of erosion resistant material is defined by a weakened or perforated line or strip in at least one of said layers of erosion resistant material or said layers of bridging material, preferably in said layers of bridging material.

A perforated line provides for a relatively simple and well-defined tear point between adjacent sections of said layers. Additionally or alternatively, a boundary between adjacent sections of said layers of erosion resistant material may be defined by a frangible or breakable portion between adjacent sections. Additionally or alternatively, a boundary between adjacent sections of said layers may be defined by a scored or weakened section of said layers.

In a further embodiment, the erosion shield may comprise a perforated, weakened, scored or frangible section arranged in a lengthwise direction parallel to the leading edge of the erosion shield, to allow for easier delamination or peeling of layers of the erosion shield away from said leading edge. In such a case, preferably such a breakable section is defined in the bridging layers between adjacent layers of erosion resistant material. Such a lengthwise breakable section of the erosion shield may be located on the erosion shield at the boundary point between the pressure side and the suction side of a wind turbine to receive the erosion shield, or may be positioned at an alternative location, e.g. at a location on the erosion shield which corresponds to the preferred angle of attack of oncoming wind at the wind turbine blade.

In one embodiment, said layers of erosion resistant material are formed from a first resilient material and a second flexible material, said first resilient material provided on said erosion shield to cover a leading edge of a wind turbine blade, said second flexible material arranged to extend from said first resilient material at either side of said leading edge.

Providing the erosion resistant layers as a composite of a resilient material at the leading edge and a flexible material depending from the leading edge results in a high degree of erosion resistance, due to the resilient material, but which is relatively easily peelable from the erosion shield once said resilient material has been eroded or ruptured.

In an additional or alternative embodiment, said plurality of layers of erosion resistant material are bonded to adjacent layers in the stack using at least one bonding area, wherein said at least one bonding area between adjacent layers of erosion resistant material is arranged adjacent the leading edge of the erosion shield.

In this embodiment, preferably the layers of erosion resistant material are not bonded to each other at the leading edge. This allows the layers to more easily peel from the erosion shield, as once a layer is ruptured it will peel back from the point of rupture to the bonding area. Accordingly, the unbounded section of the layer will present a greater surface area to the oncoming wind, and the delamination force exerted on the layer will be greater.

Preferably, a cavity or channel is defined in said layers of bridging material, said channel or cavity arranged adjacent the underside of inner surface of the outer adjacent layer of erosion resistant material, preferably at the leading edge of the erosion shield.

The use of a cavity adjacent the undersurface of a layer of erosion resistant material means that the erosion resistant layer is not bonded to the underlying layer at the leading edge. Thus, once a rupture or erosion of the outer layer occurs at the leading edge, the layer of erosion resistant material will more easily delaminate from the erosion shield, improving shield performance.

Preferably, said channel is a through-going aperture extending through said layer of bridging material.

Preferably, said layers of erosion resistant material are approximately 0.1-0.5 mm deep, preferably 0.3 mm deep.

Preferably, said at least one layer of bridging material is approximately 0.05-0.25 mm deep, preferably 0.1 mm deep.

In one embodiment, the plurality of layers of erosion-resistant material may be formed from different types of erosion resistant materials, said materials having various different properties.

Preferably, said erosion resistant material may be selected from the following available materials: W8607 from 3M, or 54994 PV3 from tesa SE.

Preferably, said bridging material may be selected from the following available materials: STEODUR-PUR-Kantenschutz from Bergolin; ALEXIT Leading Edge Protection 442-52 from Mankiewicz; XA258 from Hempel; or Oldodur Blade Finish from Relius.

There is also provided a wind turbine blade having an erosion shield as described above.

In particular, the wind turbine blade extends in a longitudinal direction parallel to a longitudinal axis and comprises a tip end and a root end, the wind turbine blade comprising a profiled contour including a pressure side and a suction side, as well as a leading edge and a trailing edge with a chord having a chord length extending therebetween, the profiled contour, when being impacted by an incident airflow, generating a lift, wherein the erosion shield is provided along at least a section of said leading edge.

In one embodiment, the wind turbine blade comprises a channel formed at the leading edge of the blade, said channel for receiving said erosion shield such that the erosion shield is provided flush with the surfaces of the blade adjacent the channel and the erosion shield.

There is further provided a wind turbine having at least one wind turbine blade comprising an erosion shield as described above.

In particular, the wind turbine comprises a wind turbine blade for a rotor of a wind turbine having a substantially horizontal rotor shaft, the rotor comprising a hub, from which the wind turbine blade extends substantially in a radial direction when mounted to the hub.

DESCRIPTION OF THE INVENTION

An embodiment of the invention will now be described, by way of example only, with reference to the accompanying drawings, in which.

Common elements between the different embodiments will be referred to using the same reference numerals.

Figure 1:
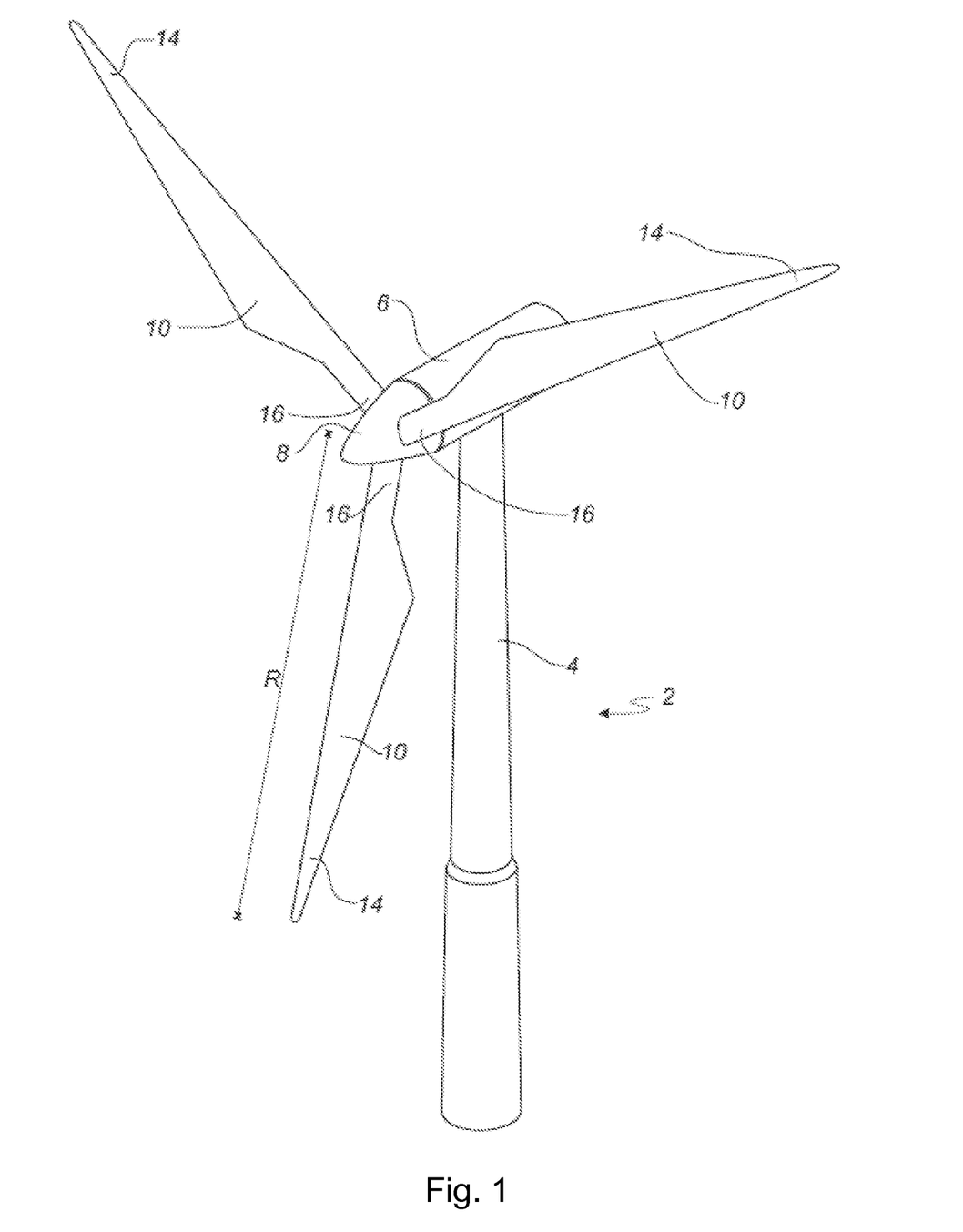
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
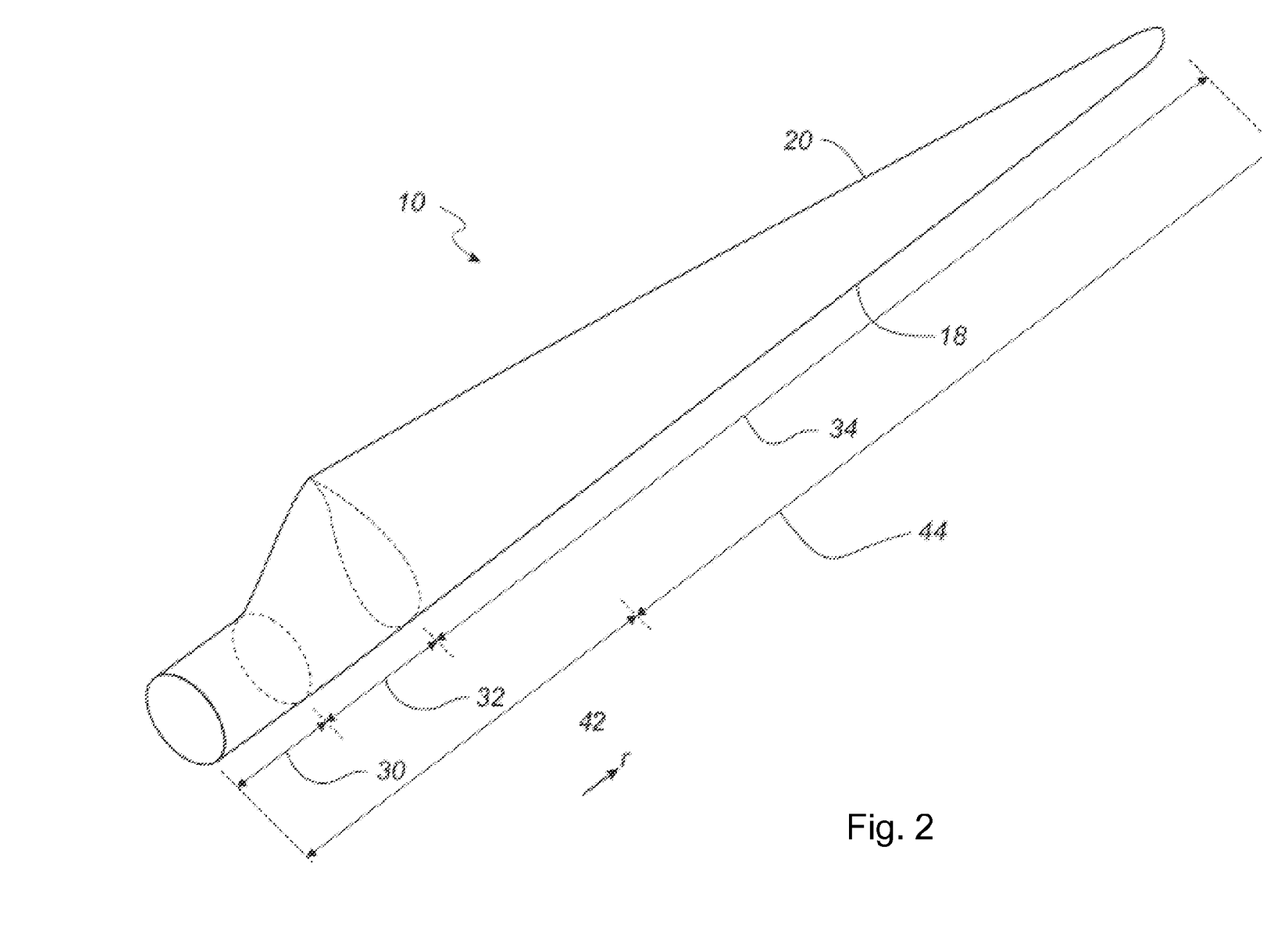
FIG. 2 shows a schematic view of a wind turbine blade according to the invention.

FIG. 2 shows a schematic view of a first embodiment of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
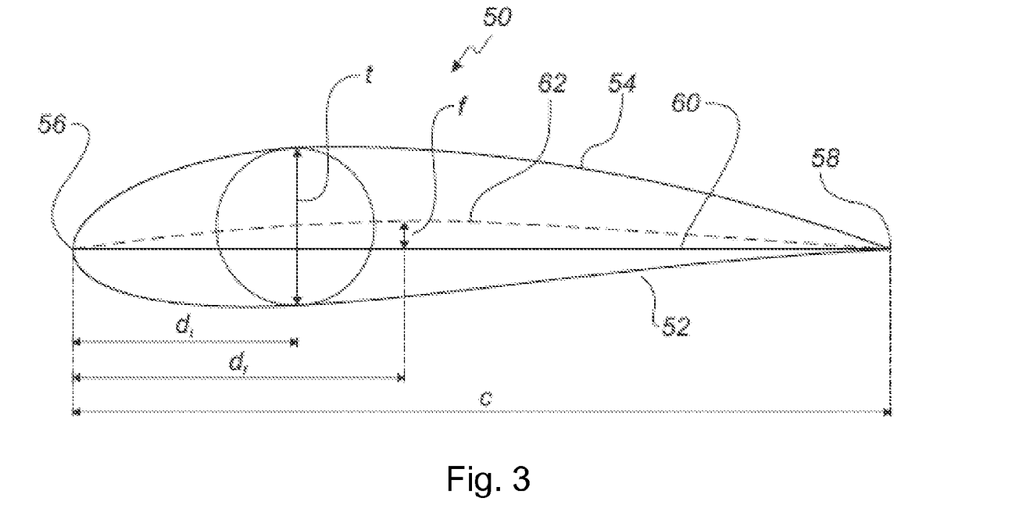
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Figure 5A:
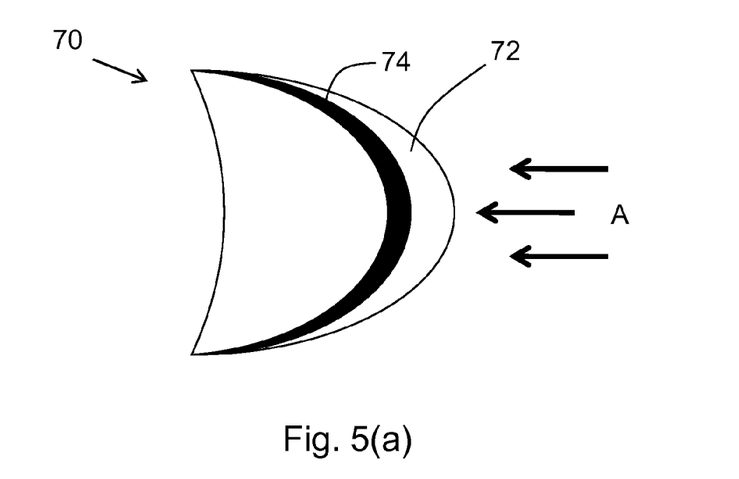
FIGS. 5(a)-(c) illustrate in partial cross-section the operation of the erosion shield of FIG. 4 in use on the blade of FIG. 2.
Figure 5B:
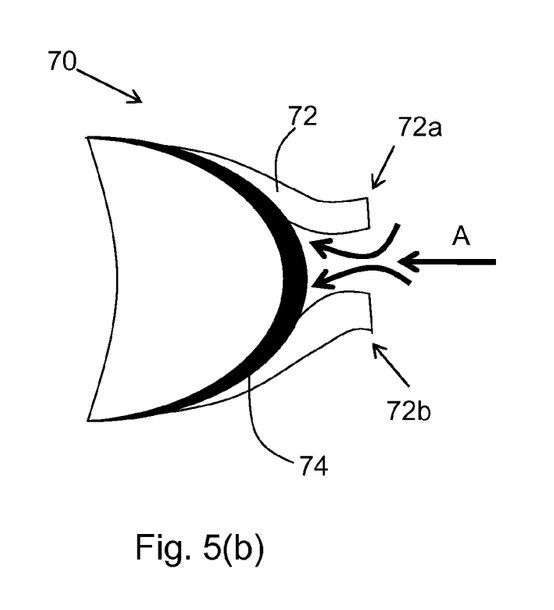
Figure 5C:
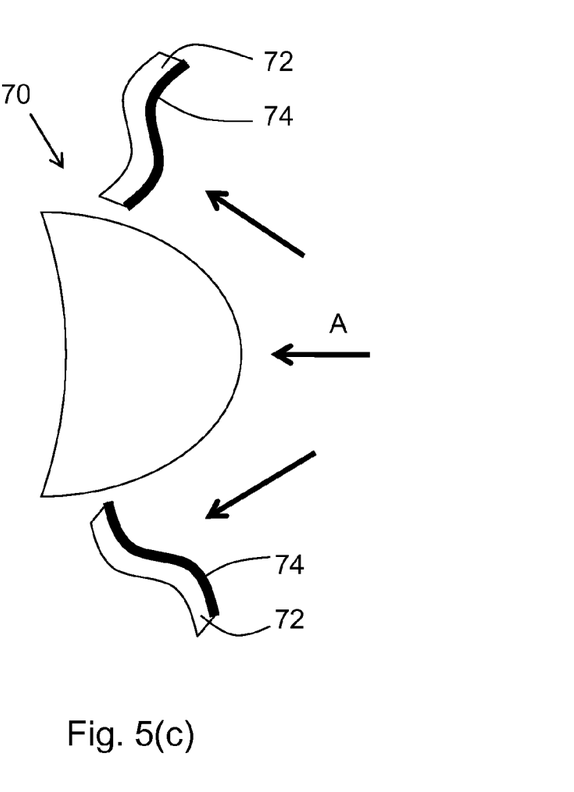

With reference to FIG. 5, an erosion shield according to the invention is indicated generally at 70. The erosion shield 70 comprises an outer leading edge surface 70a, and an inner blade surface 70b which is arranged to be applied to the leading edge 56 of a wind turbine blade 10.

Figure 4:
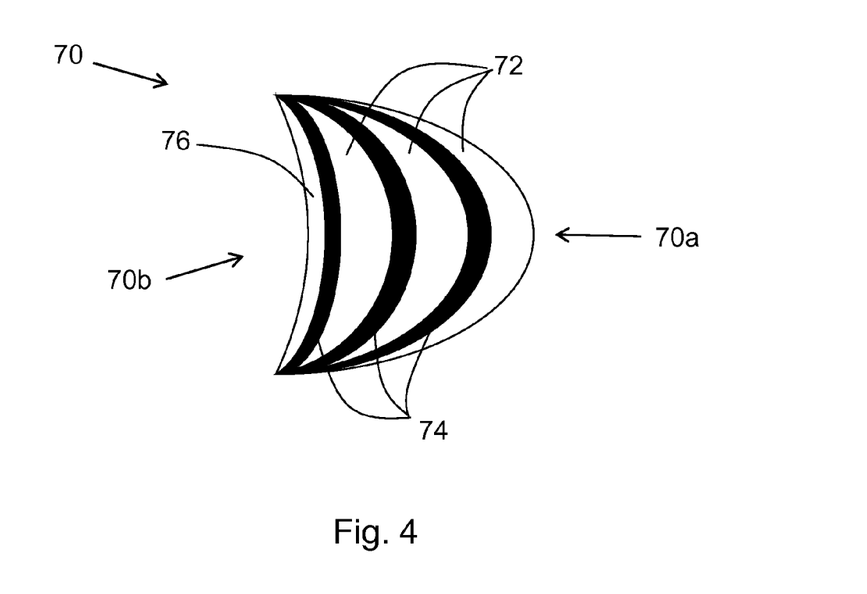
FIG. 4 shows a cross-sectional view of an erosion shield for a wind turbine blade according to the invention.

The erosion shield 70 comprises a plurality of layers of erosion resistant material 72, interleaved with layers of a bridging material 74, to create a stacked structure. The outer leading edge surface 70a is substantially formed by the outermost layer of erosion resistant material 72. Preferably, the erosion shield 70 further comprises an adhesive layer 76 provided at said inner blade surface 70b, said adhesive layer 76 arranged to attach the erosion shield 70 to a blade leading edge 56.

The erosion resistant material 72 is preferably formed by a resilient material which has improved erosion resistant properties relative to the relatively fragile material which forms the body of a wind turbine blade 10.

The bridging material 74 is formed from a substantially disposable or weakened material, such that there is a relatively low adhesive bond strength between subsequent layers of the erosion resistant material 72. This allows for the erosion resistant material 72 to relatively easily peel away from or delaminate from the erosion shield 70 in the event of a layer rupture.

While only three layers of erosion resistant material 72 and bridging material 74 are shown in the embodiment of FIG. 4, it will be understood that the erosion shield 70 may comprise any number of suitable layers. This may be selected depending on the desired lifetime of the erosion shield 70, as a greater number of layers of erosion resistant material 72 would result in a longer lifetime of the erosion shield 70 before replacement is required.

With reference to FIGS. 5(a), (b) and (c), the operation of an erosion shield 70 on a wind turbine blade according to the invention is illustrated. Only the outer layers of erosion resistant and bridging materials 72,74 are shown.

FIG. 5(a) illustrates the erosion shield 70 under normal operation on a wind turbine blade (not shown). The outermost exposed layer of the erosion resistant material 72 is provided at the leading edge of the blade, and is acted upon by the oncoming wind, indicated by arrows A. The erosion resistant material 72, being more resistant to erosion than the relatively brittle fibre composite material forming the body of the wind turbine blade, is better able to withstand the abrasive action of the wind, and any foreign objects, sand, salt, etc. carried by the wind A.

After a period of time however, the outer layer of the erosion resistant material 72 will rupture due to the continued erosive and abrasive action of the wind A, as shown in FIG. 5(b). At the location where the erosion resistant layer 72 ruptures, the layer of erosion resistant material 72 will form edges or free ends 72a,72b. The wind A will generally act to flutter said free ends 72a,72b, by acting on the now exposed underside of the outermost layer 72.

It will be understood that the free ends 72a,72b shown in FIG. 5(b) may be exaggerated for the purpose of clarity, and that an initial rupture of an outer layer of material may not result in freely fluttering free ends of material, rather an aperture defined in the outer layer which, over continued erosive action, may result in free ends as shown in FIG. 5(b).

With reference to FIG. 5(c), the action of the wind A on the free ends 72a,72b of the outermost layer of erosion resistant material 72 will act to force the erosion resistant layer 72 back from the point of rupture at the leading edge of the erosion shield 70. Due to the presence of the underlying weakened or disposable layer 74, the outermost erosion resistant layer 72 is easily delaminated from the erosion shield without a substantial amount of force, e.g. the outermost layer 72 can be dynamically delaminated from the erosion shield 70 solely under action of the wind A.

As the outermost layer of erosion resistant material 72, as well as the underlying layer of bridging material 74, is peeled away from the erosion shield 70 by the wind A, the next layer of erosion resistant material of the shield 72 is exposed to the wind A. The erosion shield 70 accordingly presents a relatively smooth erosion resistant surface, without any loss of aerodynamic efficiency or increase in aerodynamic noise due to the continued presence of fluttering ends of layers of the erosion shield at the leading edge of the blade.

The above cycle of rupture and dynamic delamination or peeling is repeated iteratively for each layer of erosion resistant material 72 provided in the erosion shield 70. Accordingly, the erosion shield 70 is arranged to dynamically shed outer layers of the erosion resistant material 72 once such layers have been used, without requiring extensive maintenance operations.

The bridging layer material 74 is chosen such that the adhesive bond strength between adjacent layers of the erosion resistant material 72 is less than the cohesive tensile strength of the erosion resistant material 72. Accordingly, once the outer layer of erosion resistant material has been eroded or ruptured, the peel strength required to delaminate the ruptured layer from the shield 70 is relatively low, and may be accomplished simply under action of the wind.

A normal indicator of good adhesive bond strength is that the pull-off strength under ISO 4624 is above 5 MPa with cohesive failure mode. Accordingly, the adhesive bond strength between adjacent layers of the erosion resistant material 72 of the erosion shield 70 according to the invention is below 5 MPa, preferably under 2 MPa.

The erosion resistant material 72 may be any material which presents good erosion-resistant properties, e.g. any material as is known from existing erosion-resistant devices, e.g. helicopter tape, and/or materials such as W8607 from 3M, or 54994 PV3 from tesa SE. Preferably, said layers of erosion resistant material are approximately 0.1-0.5 mm deep, preferably 0.3 mm deep.

The layer of bridging material 74 may be formed from an adhesive having a relatively low bond strength between adjacent erosion resistant layers 72. In this case, the erosion shield 70 may be formed by adhering successive layers of erosion resistant material 72 together in a stack. Preferably, said at least one layer of bridging material is approximately 0.05-0.25 mm deep, preferably 0.1 mm deep.

Preferably, the adhesive layer 76 arranged to attach the erosion shield 70 to a blade leading edge 56 comprises a layer of acrylic-based pressure sensitive adhesive, but it will be understood that any suitable adhesive layer may be used. The thickness of the adhesive layer may be approximately 0.05-0.25 mm, preferably 0.1 mm.

In one embodiment, the bridging layer 74 may be provided as a double-sided adhesive tape, wherein the bridging layer 74 is bonded to the outer adjacent layer of erosion resistant material 72 using a relatively strong adhesive, and is bonded to the inner adjacent layer of erosion resistant material 72 using a relatively weak adhesive, such that in the event of delamination or peeling of the outer adjacent erosion resistant layer, the adhesive tape will be removed with the outer layer, thereby exposing a smooth surface of the underlying inner adjacent layer of erosion resistant material. In such a case, a pressure sensitive acrylic adhesive may be used on the side of the adhesive tape bonded to the outer adjacent layer, while a pressure sensitive silicone-based adhesive may be used on the side of the adhesive tape bonded to the inner adjacent layer. Additionally or alternatively, the erosion shield 70 may be formed as a single formed or moulded structure having an interleaved arrangement of layers of materials having different structural properties, e.g. through co-extrusion of two thermoplastics having different material properties. The bridging layers 74 may be formed of a material having a brittle or frangible structure, which can be relatively easily broken away from the erosion shield 70 once an overlying erosion resistant layer 72 has been eroded.

The bridging layers 74 may comprise a thermoplastic material, and/or a coating material that will work as a semi-resistant erosion layer as well as functioning as an adhesive between adjacent layers of the erosion resistant material 72.

Preferably, the bridging material 74 is be selected from any of the following available materials: STEODUR-PUR-Kantenschutz from Bergolin; ALEXIT Leading Edge Protection 442-52 from Mankiewicz; XA258 from Hempel; or Oldodur Blade Finish from Relius. It will be understood that any other suitable bridging material may be used in the erosion shield.

Figure 6:
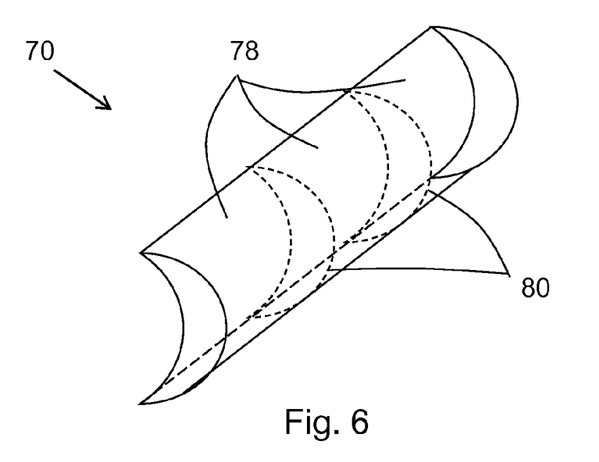
FIG. 6 shows a perspective view of a portion of an embodiment of erosion shield according to the invention.

A further possible enhancement of the invention is illustrated in FIG. 6. The erosion shield 70 is provided at the leading edge of a wind turbine blade (not shown), the shield 70 extending along a portion of the length of the blade. The erosion shield 70 is divided into a series of sections 78 along the length of the shield 70, the boundary between adjacent sections 78 marked by a breakable, frangible or weakened section (indicated by dashed lines 80) of the shield 70 which extends in a direction transverse to the lengthwise direction of the erosion shield 70. Such weakened sections 80 may comprise an area of the shield which purposively comprises layers 72,74 or reduced thickness, and/or a perforated or scored section of at least one of the layers 72,74 of the erosion shield.

The weakened sections 80 provide a pre-defined tear line for at least one of the layers 72,74 of the erosion shield 70, such that any delamination of the erosion shield layers 72,74 may be arranged to occur for only at that section 78 of the erosion shield wherein a rupture or erosion occurs of the outermost layer of the erosion resistant material 72. This provides for improved performance of the erosion shield 70, as the entire outer layer of erosion resistant material 72 may be prevented from complete delamination as a result of only a single rupture point.

Accordingly, it will be understood that the outer leading edge surface 70a of the erosion shield may be formed by the exposed sections of a plurality of the layers of erosion resistant material 72, dependent on the extent of the erosion which occurs in each of the predefined sections 78.

Preferably, a greater number of sections are provided towards the end of the erosion shield provided at the tip end of the wind turbine blade. Due to the greater erosion experienced at the tip end of the blade as opposed to the root end of the blade, accordingly it is of greater concern that the portions of the erosion shield in this area are able to react efficiently to any rupture or erosion of the outer layer of the erosion shield.

It will be understood that the individual sections of the erosion shield when measured along the longitudinal direction of the erosion shield may decrease in width moving from the root end of the erosion shield towards the tip end of the erosion shield.

Additionally or alternatively, the erosion shield may be constructed to have a greater number of layers of erosion resistant material 72, and possibly layers of bridging material 74, at the tip end of the erosion shield 70 than at the root end of the erosion shield 70. This ensures that there will be proportionally more erosion protection at the tip end of the blade, where the protection is most needed. Such a construction provides for a more effective erosion shield, and increases the time between maintenance operations to replace the erosion shield.

Additionally or alternatively, the erosion shield 70 may comprise a further weakened tear line (not shown) provided along the leading edge of the erosion shield 70, in a direction parallel to the lengthwise direction of the shield 70. Such a longitudinal pre-defined tear line may allow for the relatively easy delamination or peeling of the outermost layer of erosion resistant material 72, as the oncoming wind acts to force free ends of the outer layer adjacent the rupture point away from the leading edge.

It will be understood that such weakened sections are preferably provided within the layers of the bridging material 74, such that the erosion resistant properties of the layers of erosion resistant material 72 are not affected by their presence. The weakened sections may be formed during the manufacturing process as an intentionally weakened section, e.g. a section of reduced thickness, or the weakened sections may be formed through a post-production treatment operation, e.g. a perforation or scoring operation on a portion of the erosion shield.

Figure 7:
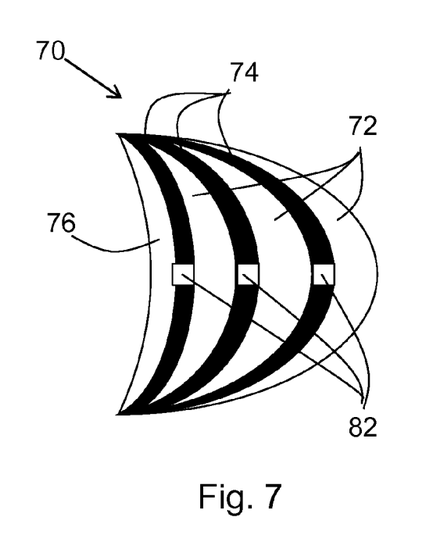
FIG. 7 shows a cross-sectional view of a further embodiment of erosion shield according to the invention.

A further alternative embodiment of an erosion shield according to the invention is illustrated in FIG. 7. Similar to the embodiment of FIG. 4, the erosion shield 70 of FIG. 7 comprises an interleaved structure of layers of erosion resistant material 72 and bridging material 74 arranged for attachment to a leading edge of a wind turbine blade. In the embodiment of FIG. 7, a cavity or channel 82 is defined in the layers of bridging material 74, said cavity or channel 82 located at the centre point of layer of bridging material 74 along the leading edge of the shield 70, and extending in a direction parallel to the lengthwise direction of the shield 70.

The channel 82 is preferably provided against the underside of the adjacent outer layer of erosion resistant material 72, and ensures that the outer layer of erosion resistant material 72 is not bonded to the underlying layer of bridging material 74 along the leading edge of the erosion shield 70.

As a result, once the outer layer of erosion resistant material 72 ruptures or erodes at the leading edge of the shield 70, the portions of the layer 72 not bonded to the underlying bridging material 74 will immediately delaminate or peel away from the shield 70, presenting fluttering free ends of the erosion resistant material 72. This may result in a quicker delamination of the outer layer 72, as the oncoming wind is able to act upon a greater area of the underside of the outer layer 72 to peel away the outer layer and the underlying bridging layer 74.

The cavity or channel 82 may be a through going aperture extending through each entire layer of bridging material 74, or may be a shallow indentation in the surface of the layer of bridging material 74 abutting the adjacent outer layer of erosion resistant material 72.

It will be understood that the width of the channel 82 may be of any suitable dimension. While the embodiment of FIG. 7 shows the cavity 82 as being defined to the leading edge, it will be understood that the cavity may extend through a greater portion of the bridging layers 74.

Figure 8:
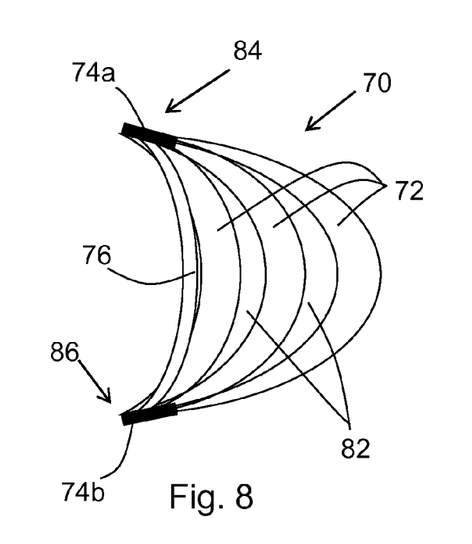
FIG. 8 shows a cross-sectional view of a further embodiment of erosion shield according to the invention.

For example, with reference to FIG. 8, in one possible embodiment of erosion shield 70 according to the invention, successive layers of erosion resistant material 72 may be bonded to each other by an adhesive bridging layer 74 provided at opposite sides of the erosion shield 70. In such a case, the layer of bridging material 74 may comprise first and second adhesive tapes, indicated at 74a,74b arranged at the respective sides of the erosion shield 70 between successive layers of erosion resistant material 72, namely at the upper suction side 84 and the lower pressure side 86 of the erosion shield 70.

It will be understood that the cavity 82 and/or the weakened section which extends in a lengthwise direction along the erosion shield 70 might not be provided along the leading edge of the erosion shield 70, for example it may extend along a line corresponding to a predicted area of initial rupture of the outermost erosion resistant layer 72.

It will be further understood that the layers 72,74 of the erosion shield may be formed of several types of composite materials having different mechanical properties. For example, the erosion resistant material 72 may comprise a resilient material composition at the leading edge of the erosion shield 70, but may gradually be formed from a composition having flexible mechanical properties adjacent to the leading edge, thereby being more flexible and easier to delaminate once the portion of the layer at the leading edge has been ruptured.

There is further provided a wind turbine blade 10 having an erosion shield 70 as described in any of the above embodiments, and a wind turbine having at least one of said wind turbine blades 10. In one preferred embodiment, the wind turbine blade 10 is arranged such that a channel (not shown) is defined in the body of the blade 10 along the leading edge 56 of the blade 10, the depth of the channel configured such that the outer exposed surface 70a of the erosion shield 70 is flush with the adjacent exposed surfaces of the wind turbine blade 10. Accordingly, the aerodynamic properties of the blade 10 are not significantly affected through use of such a layered erosion shield 70.

The erosion shield 70 herein described presents an improved erosion resistant system over the prior art. The dynamic delamination of successive layers of the erosion shield under action of the wind once an outer layer is eroded or ruptured provides an increased erosion shield lifetime, and increased time between maintenance, repair and replacement operations, with minimal impact on aerodynamic performance and noise issues due to the partial erosion of the shield.

It will be understood that the figures shown are purely illustrative, and features shown, e.g. layer thicknesses, shapes, wind direction, etc., are not to scale.

The invention is not limited to the embodiment described herein, and may be modified or adapted without departing from the scope of the present invention.

The invention claimed is:

1. An erosion shield for a wind turbine blade, the erosion shield having an external surface exposed at a leading edge of the wind turbine blade and comprising:
   a plurality of layers of erosion resistant material, said plurality of layers arranged in a stack from an outermost layer substantially forming said external surface to an innermost layer arranged to be attached to a leading edge of a wind turbine blade, said plurality of layers bonded to adjacent layers in the stack,
   wherein said plurality of layers of erosion resistant material have a cohesive strength or tensile strength greater than an adhesive strength or bond strength between adjacent or subsequent layers, such that at least a section of an outermost exposed layer will delaminate or peel from said erosion shield under the action of wind when at least a portion of said section of said outermost exposed layer has been eroded or ruptured, to present a relatively smooth external surface of said erosion shield.

2. The erosion shield of claim 1, wherein said plurality of layers are adhesively bonded to adjacent layers in the stack, and wherein said plurality of layers of erosion resistant material have a cohesive strength greater than the adhesive bond strength between adjacent layers.

3. The erosion shield of claim 1, wherein said layers of erosion resistant material comprise an inner surface facing away from the external surface of the erosion shield and an outer surface facing towards the external surface of the erosion shield,
   wherein said erosion shield further comprises at least one layer of bridging material located between adjacent layers of erosion resistant material to bond adjacent inner and outer surfaces of adjacent layers of erosion resistant material in said stack.

4. The erosion shield of claim 3, wherein said at least one bridging layer comprises a layer of adhesive.

5. The erosion shield of claim 3, wherein said at least one bridging layer has a tensile cohesive strength less than a tensile cohesive strength of said layers of erosion resistant material.

6. The erosion shield of claim 3, wherein said at least one layer of bridging material has a relatively stronger bond to an adjacent inner surface of a layer of erosion resistant material than to an adjacent outer surface of a layer of erosion resistant material.

7. The erosion shield of claim 3, wherein a boundary between adjacent sections of said layers of erosion resistant material is defined by a perforated line or strip in at least one of said layers of erosion resistant material or in at least one of said layers of bridging material.

8. The erosion shield of claim 7, wherein said perforated line or strip is in said layers of bridging material.

9. The erosion shield of claim 3, wherein the erosion shield may comprise a perforated, weakened, scored or frangible section arranged in a lengthwise direction parallel to the leading edge of the erosion shield.

10. The erosion shield of claim 3, wherein a cavity or channel is defined in said layers of bridging material, said channel or cavity arranged adjacent the underside of inner surface of the outer adjacent layer of erosion resistant material.

11. The erosion shield of claim 10, wherein said channel or cavity is arranged at the leading edge of the erosion shield.

12. The erosion shield of claim 3, wherein said at least one layer of bridging material is approximately 0.05-0.25 mm deep.

13. The erosion shield of claim 12, wherein said at least one layer of bridging material is approximately 0.1 mm deep.

14. The erosion shield of claim 1, wherein said layers of erosion resistant material are approximately 0.1-0.5 mm deep.

15. The erosion shield of claim 14, wherein said layers of erosion resistant material are approximately 0.3 mm deep.

16. The erosion shield of claim 1, wherein said erosion shield is arranged to extend in a lengthwise direction along a portion of a leading edge of a wind turbine blade, and wherein said layers of erosion resistant material are divided into a plurality of sections along the length of the erosion shield, wherein said sections of said erosion resistant layers are arranged to individually delaminate when at least a portion of an erosion resistant layer within a particular section has been eroded or ruptured.

17. A wind turbine blade having an erosion shield as claimed in claim 1.

18. A wind turbine blade as claimed in claim 17, wherein the wind turbine blade comprises a channel formed at the leading edge of the blade, said channel for receiving said erosion shield such that the erosion shield is provided flush with the surfaces of the blade adjacent the erosion shield.

19. A wind turbine having at least one wind turbine blade as claimed in claim 17.

* * * * *